July 25, 1967  J. A. CARLSON  3,332,181
TRACTOR MOUNTED LOGGING TOWER
Filed June 16, 1965  3 Sheets-Sheet 1
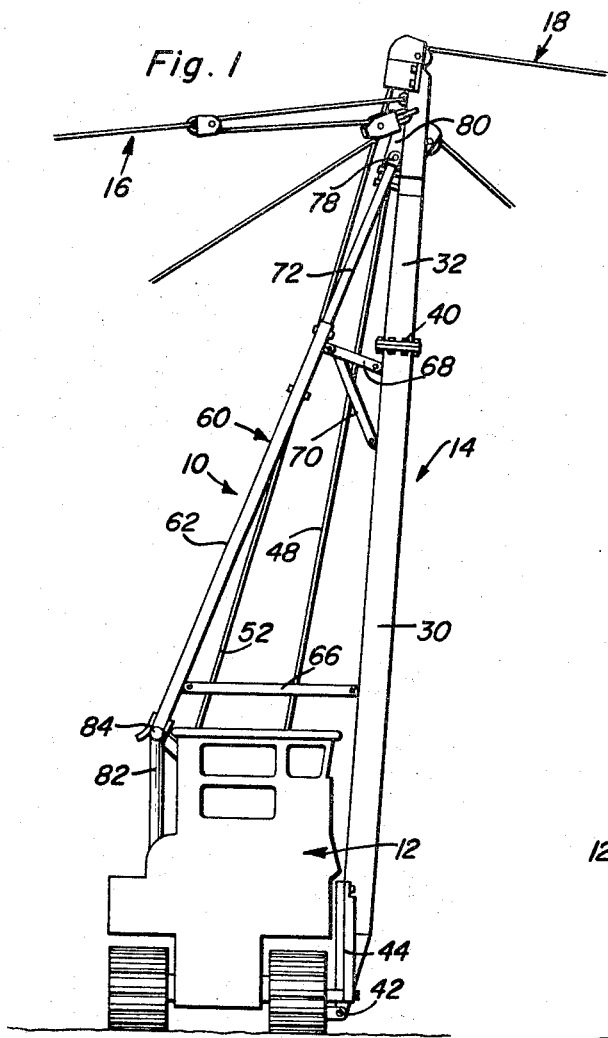
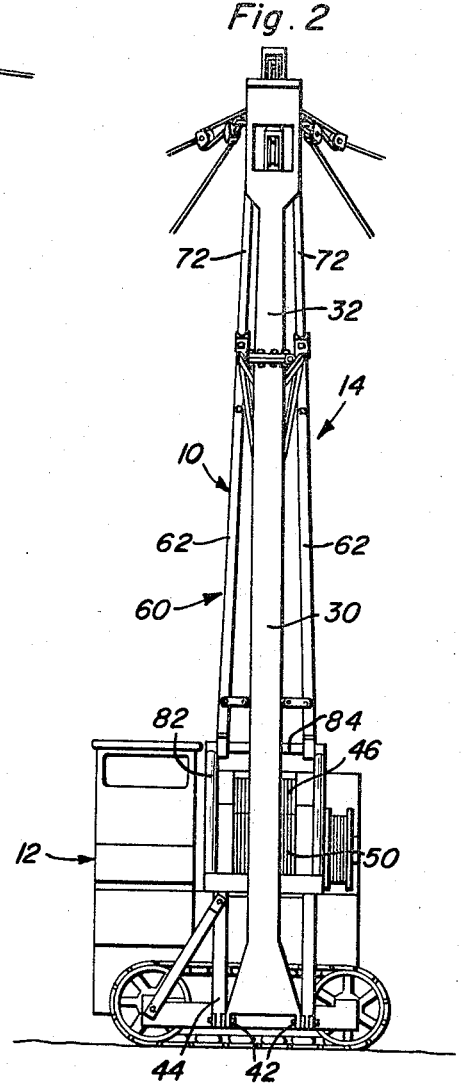
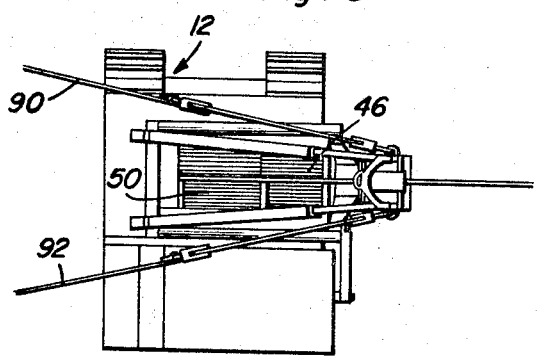
James A. Carlson
INVENTOR.
BY Clarence A. O'Brien
and Harvey B. Jacobson
Attorneys

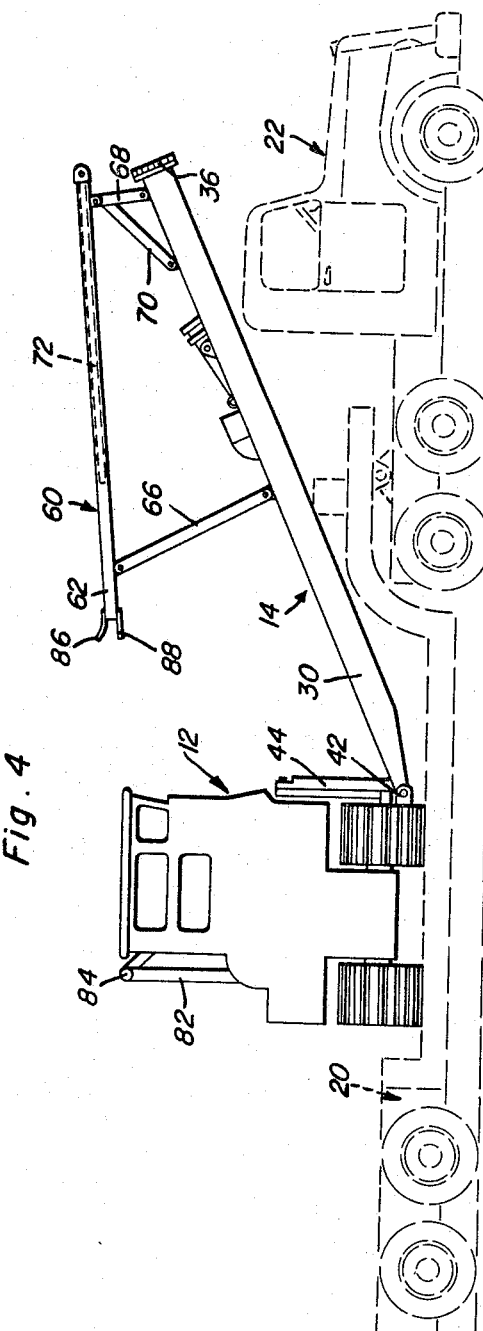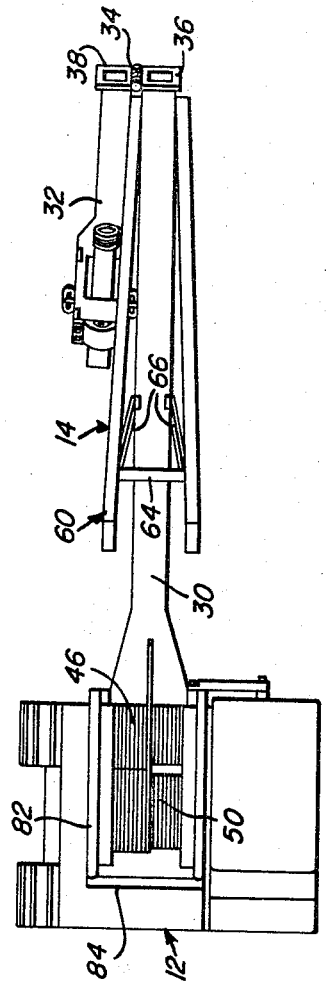

July 25, 1967 J. A. CARLSON 3,332,181
TRACTOR MOUNTED LOGGING TOWER
Filed June 16, 1965 3 Sheets-Sheet 3

James A. Carlson
INVENTOR.

United States Patent Office 3,332,181
Patented July 25, 1967

3,332,181
TRACTOR MOUNTED LOGGING TOWER
James A. Carlson, 810 Highway 101,
Astoria, Oreg. 97103
Filed June 16, 1965, Ser. No. 464,373
6 Claims. (Cl. 52—117)

ABSTRACT OF THE DISCLOSURE

A collapsible logging tower including a folding boom pivotally mounted on a mobile support, and a bracing assembly detachably mounted on the mobile support and selectively extensible so as to brace the unfolded boom through an engagement with the separate sections thereof.

This invention comprises a novel and useful tractor-mounted logging tower and while relating generally to logging equipment more particularly is directed to a tractor mounted and mobile logging tower which is readily movable from place to place and constitutes a convenient and practical substitute for the customary spar trees formerly used in the logging industry and conventionally called yarders.

Heretofore, in the logging of tall timbers in rough terrain, it has been conventional practice to select a conveniently located tree, trim the branches therefrom and the top and employ the stem of the tree as a spar tree or yarder upon which are mounted pulley blocks over which cables are run for attachment to various logs after they are felled from the timber area that is being worked and drag the logs to a convenient location for further handling. Obviously, the trimming of the selected spar tree and arranging it for operation is a time-consuming operation. Further, its radius of movement is relatively limited as far as the entire logging area is concerned so that from time to time different trees must be selected and equipped to continue the logging operation.

The primary purpose of the present invention is to provide a readily mobile logging tower which will take the place of the heretofore selected and particular spar trees whereby a single logging tower will completely serve an entire logging area by being moved from place to place therein with a much greater convenience and precision than the selection and equipment of even a considerable number of spar trees.

The advantages and principles of this invention are practiced by providing a logging tower or yarder consisting of a boom mounted upon a mobile support so that the boom may be readily moved from place to place as a service that may be desired and thus ensure that the logging tower is precisely placed to function to the best advantage for a particular area of a logging operation.

The primary object of this invention is to provide a portable yarder or logging tower in which a yarder boom is foldably mounted on a tractor or similar vehicle whereby it may be utilized to the best advantages in a logging area and in localities in which no suitable spar tree is available.

A further object of the invention is to provide portable logging units which may be readily moved to any desired location suitable for a yarder and which may be located and rigged in a relatively few minutes thus saving labor and time so that the yarding operations can start substantially immediately.

A further important object of the invention resides in the provision of a portable logging tower including structural provision enabling the tower to be readily lowered to a substantial horizontal position, to shorten the length of the tower and to conveniently store it in lowered position to facilitate the transportation of the apparatus from place to place upon a truck-type vehicle.

A still further object of the invention is to provide a portable logging tower or yarder which will accomplish all of the normal purposes and objects of the spar tree formerly used for this purpose with the added advantages of portability, relatively rapid ease of rigging and disassembling.

Yet another object of the invention is to provide an apparatus in accordance with the preceding objects which shall be well adapted for use in high-lead logging and yarding operations.

A further and more specific object of the invention is to provide a logging tower or yarder having stiff legs or rigid supporting columns which support the logging tower in an upright position and which may be readily disconnected to enable the tower to be folded to a lowered horizontal position for transportation purposes.

Logging or yarding towers under the requirements of present safety codes require four guy lines thereon when they are without rigid supporting columns while those having rigid supporting columns or stiff legs are required to employ only two guy lines. Therefore, by providing a logging tower having stiff legs thereon, the time for rigging the tower is materially reduced and the structure of the apparatus is materially simplified.

Yet another object of the invention is to provide a logging tower mounted on a tractor and which enables the applying of substantially equal supporting pressure on the opposite continuous tracks of the tractor while yarding and thereby eliminating the need for additional outriggers.

Basically, the above objects are achieved by the provision of a unique portable logging tower including a mobile base, a pivotally mounted collapsible boom thereon, and an associated collapsible bracing unit. The boom includes a main lower section pivotally secured to the mobile support for movement between horizontal and vertical positions, and an upper boom section pivotally or hingedly secured to the lower boom section for movement between a folded position overlying the lower or main boom section and an erected position rigid with the lower section and projecting longitudinally therefrom. The bracing unit also includes upper and lower sections with the lower section being secured to the main boom section for pivotal movement therewith and with the upper bracing section being selectively extended so as to engage and bracingly interlock with the extended upper boom section upon an erection of the boom, the brace unit being releasably engageable with the mobile support itself so as to effect a direct bracing between both sections of the boom and the mobile support.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of a portable logging tower or yarder in accordance with this invention and showing the stiffening column or stiff legs connected to the tower and showing the hinge mounting of the boom of the tower upon the tractor;

FIGURE 2 is a side elevational view of the apparatus of FIGURE 1, both views showing the logging tower in its fully erected and operative position;

FIGURE 3 is a top plan view of the tower of FIGURES 1 and 2 and showing the gantry for connecting the supporting column or stiff legs to the frame of the tractor;

FIGURE 4 is a side elevational view of the tractor with the logging tower mounted thereon and showing the logging tower in its collapsed and lowered position and with the tractor and tower loaded for transportation on a trailer body shown in phantom lines therein;

FIGURE 5 is a top plan view of the tractor, with the logging tower or yarder being shown in folded, lowered and horizontal positions when arranged for transportation;

Figure 6:
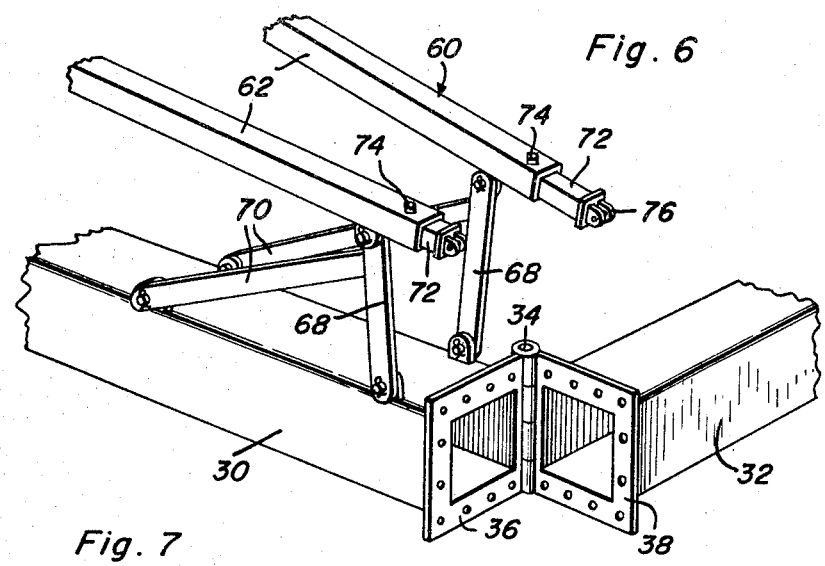
Figure 7:
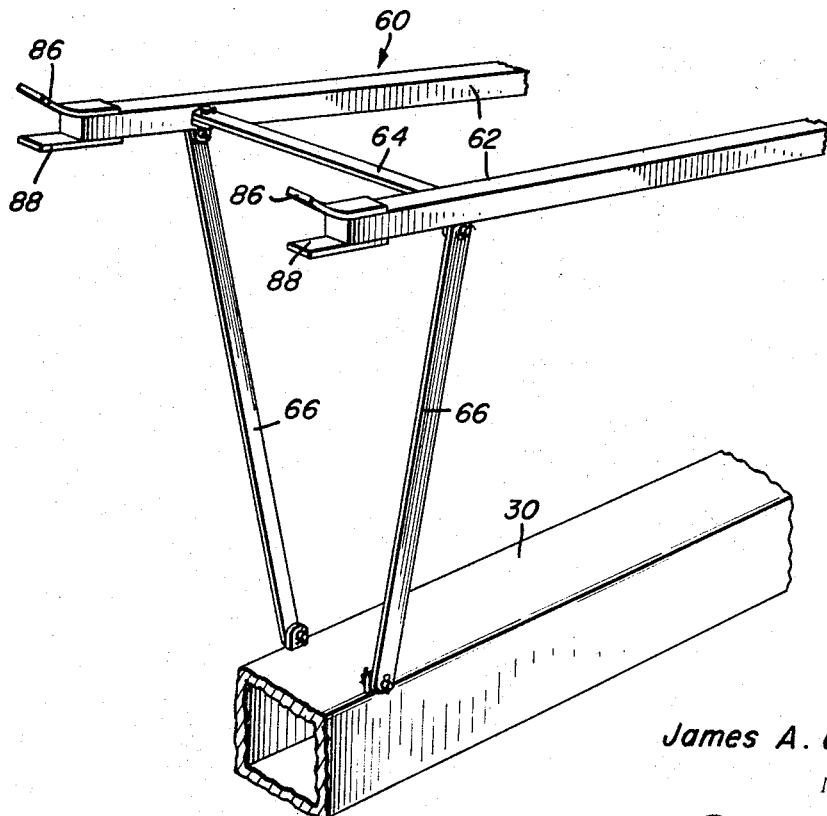

FIGURE 6 is a fragmentary perspective view upon an enlarged scale of the main or base section of the boom with the top section of the boom being shown in hinged partially folded relation and with the stiff leg assembly attached to the main portion and including slidingly telescoped upper stiff legs forming a part thereof; and, FIGURE 7 is a fragmentary perspective view of the stiff leg or rigid supporting column connected to the lower part of the boom and showing the plates for connecting the stiff legs to the gantry.

Reference is now made first to FIGURES 1 and 2 which show a preferred form of a mobile foldable logging tower or yarder in accordance with this invention. The apparatus in its entirety is indicated generally by the numeral 10 and consists of a mobile support 12 which is preferably in the form of an endless tread-type of tractor of any conventional design which serves both to support the logging tower and to provide power for its operation. Mounted upon the mobile support in a manner to be subsequently set forth is a collapsible and foldable boom indicated generally by the numeral 14 and which constitutes the logging tower or yarder. Any suitable cable rigging assembly indicated generally by the numeral 16 is detachably connected to the tower or yarder 14 for stabilizing and retaining and bracing it in its generally vertical erected operative position. Other rigging indicated generally by the numeral 18 is suitably detachably connected to the boom 14 at its upper end and to power means carried by the mobile support for connection to timbers or logs for dragging them in the usual well understood manner.

Referring next to FIGURE 4 there is illustrated the manner in which the mobile logging tower of this invention is adapted to be readily transported over highways and the like. For this purpose there is shown a conventional low bed type of trailer indicated generally by the numeral 20 and which is connected to and maneuvered by any conventional type of tractor vehicle 22 such as a truck, trailer tractor or the like. As shown, the mobile logging tower or yarder apparatus 10 has its mobile support or tractor 12 resting upon the bed of the trailer 20 with its logging tower or yarder 14 being shown in a lowered position and with the tower being in its collapsed and folded position to reduce its overall length and height in order to comply with various legal requirements of highways and the like.

Referring now especially to FIGURES 1, 2, 4 and 6, it will be noted that the logging or yarder tower 14 consists of an elongated boom including a main lower section 30 and a relatively movable and foldable upper section 32. A hinged connection 34 unites the sections so that the upper section may be moved between longitudinal alignment with the lower section to form the entire boom as shown in FIGURES 1 and 2 or may be folded downwardly against the lower section to shorten the overall length and reduce the overall height of the apparatus in its stored and transportable position as shown in FIGURES 4 and 5. It will be appreciated that the hinged connection 34 may be disposed in any desired location along the length of the boom as may be found to be most convenient for its intended purpose.

In order to detachably connect and rigidly secure the relatively foldable lower and upper sections of the boom in the erected or assembled position thereof, there are provided laterally projecting mounting flanges 36 and 38 upon the continuous cooperating ends of the sections 30 and 32, respectively, having aligned apertures through which suitably detachable fasteners such as bolts 40 may be removably secured as in FIGURES 1 and 2. Conveniently, the boom sections are of rectangular hollow configuration.

Referring to FIGURES 1, 2 and 4, it will be noted that the lower end of the boom main or lower section 30 is pivotally connected to the mobile support 12 by means of hinge or pivot pins 42 disposed in substantially horizontal transverse alignment and by means of which the lower end of the boom is pivotally mounted upon any suitable support bracket assembly 44 upon the side of the tractor or mobile support 12 whereby the logging tower in its entirety may be vertically tilted about a generally horizontal axis between a lowered inoperative and stored position as in FIGURE 4 and a generally vertical, erect and operative position shown in FIGURES 1 and 2. To effect this tilting between the lowered and raised positions of the logging tower, use is made of a power operating means such as a power operated winch 46 carried by and powered by the tractor, which through a cable 48 connected to the upper end of the logging tower or boom effects tilting movement of the later. A further power operated means such as a winch 50 operates through a cable 52 to actuate the logging rigging assembly 18. Inasmuch as the actual operating means for raising and lowering the tower and for actuating the logging rigging are in themselves not essential to the principles of this invention and are well understood by those skilled in this art, a further description thereof is deemed to be unnecessary.

In order to stiffen the logging tower or yarder and to rigidify and retain the boom in its erect or raised position there is provided a detachable bracing means or stiffening assembly. This assembly, indicated generally by the numeral 60 comprises a stiff leg arrangement, the structural details of which are shown more clearly in FIGURES 4, 6 and 7, while the assembled relation of the stiffening means with the apparatus will be best apparent from FIGURES 1 and 2. The stiff leg assembly 60 comprises a pair of lower legs each indicated at 62 which are rigidly connected together as by a cross brace 64 as shown in FIGURE 7. The two lower legs 62 are likewise detachably connected as by braces or links 66 to the lower boom section 30. At their upper ends, the lower stiff leg sections 62 are connected to the upper end of the lower boom section 30 by brace links 68, 70 which form triangular braces. Suitable removable pivotal connections secure the braces 66, 68 and 70 to the lower stiff leg member 60 and to the corresponding portions of the lower boom section 30.

Preferably the lower stiff leg sections 62 are of rectangular or square cross-section and are hollow and telescopingly receive therein the upper stiff leg sections 72. Setscrews 74 or other suitable fastening means may be employed to lock the telescoping stiff leg sections 72 and 62 into either their operative extended positions or into their idle collapsed or retracted position as shown in FIGURE 6.

At their upper ends, the upper stiff leg sections 72 are provided with clevis connection 76 by means of which they may be detachably secured as by pins 78 to corresponding apertured mounting lugs 80 provided upon the upper end of the upper boom section 32. It will thus be apparent that the stiff leg assembly may be detached from the upper boom section when it is desired to fold the latter and lower the logging tower to its inoperative and transporting position shown in FIGURE 4.

Although detachably mounted upon the lower section of the boom, the stiff leg assembly is intended to remain attached thereto in the manner shown in FIGURES 6 and 7. However, the lower end of the stiff leg assembly is detachably connected to the tractor or mobile support 12 in a manner to be now set forth.

A gantry mounting bracket 82 is secured to the tractor 12 and has a crossbar 84 thereon. The lower ends of the two stiff leg assembly lower legs 62, see FIGURE 7, are provided with a pair of coupling flanges 86 and 88 which are adapted to embrace and rest upon the gantry bracket crossbar 84 as shown in FIGURE 2 when the logging tower is in its erected position. Any suitable fastening means is utilized to retain these flanges or brackets securely clamped upon the entry crossbar 84.

A logging tower of this invention can be readily moved in its erected position of FIGURES 1 and 2 from place to place on the logging territory to position it to the best advantage to perform the desired functions. When it is desired to fold or collapse the logging tower as, for example, for transportation in the manner shown in FIGURE 4, the erected logging tower is moved upon the low bed trailer 20 into the position thereon shown in FIGURE 4. The various guy wire assemblies which have been employed to supplement stiffening and rigid retaining of the logging tower in its erect operative position, as for example, such guy wires as those shown at 90 and 92 in FIGURE 3 are released and the logging rigging 18 as well as the guy wire rigging 16 are also released or disengaged. Thereupon, the lower ends of the stiff leg assembly 60 is disconnected from the gantry mounting 82, 84. The pin 78 is then withdrawn from the upper end of the stiff leg assembly and upon release of the fastening or locking means 84, the upper and lower portions of the stiff leg assembly are telescoped into their fully retracted or collapsed position as shown in FIGURES 4, 5 and 6. The winch 46 and cable 48 are then manipulated to lower the boom from its elevated position of FIGURES 1 and 2 into its lowered position of FIGURES 4 and 5. Thereupon the fasteners or locking means 40 are disengaged and the upper boom section 32 is folded about the hinge pin 34 in the manner suggested in FIGURE 6 and as shown in FIGURE 5 to a position where it lies alongside the lower boom section in a compact manner for storage. The device is then collapsed or folded into its smallest compass in readiness for transportation.

It will be appreciated that the reverse of this operation is performed when it is desired to assemble and erect the device for operation. The fully erect apparatus is removed from the low bed trailer 20 and driven under its own power to the desired location where the final connection of the stabilizing rigging 16 is effected.

The foregoing is considered as illlustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable logging tower comprising a mobile support, a boom, means pivotally mounting said boom at its lower end upon said support for vertical tilting about a generally horizontal axis between a substantially horizontal lowered and inoperative position and a substantially vertical operative position, said boom including a main lower section pivotally mounted upon said mobile support and a foldable upper section connected to said lower section for movement between a folded side-by-side position against said lower section and a longitudinally aligned assembled position, means releasably and rigidly securing said boom sections in assembled position, rigging connected to the upper portion of said boom for effecting logging operations, a stiff leg assembly detachably connected to said boom and to said mobile support for rigidly retaining said boom in its vertical position, said stiff leg assembly including longitudinally extending lower legs and longitudinally adjustable upper legs received by the end of the lower legs remote from said mobile support and means releasably securing said upper and lower legs in longitudinally adjusted positions, means connecting and securing the upper and lower ends of said lower legs to upper and lower portions of the main lower section of said boom, respectively, means detachably securing the upper ends of said upper legs in their longitudinally extended positions to the upper part of the upper section of said boom, means releasably connecting the lower ends of said lower legs to said mobile support.

2. The combination of claim 1 including a stiff leg mounting structure secured to said mobile support, said releasable connecting means including fastening elements on the lower ends of said lower legs releasably connectible to said mounting structure.

3. The combination of claim 1 including a source of power on said mobile support, means connecting said power to said boom and operable to effect tilting of the latter between said horizontal and vertical positions.

4. The combination of claim 3 including a second source of power on said mobile support, means connecting said rigging to said second power source.

5. The combination of claim 1 wherein said boom is pivotally mounted on one side of said mobile support.

6. The combination of claim 5 wherein said stiff leg assembly is connected to said mobile support on the opposite side thereof from said boom.

References Cited
UNITED STATES PATENTS

| | | | |
|---|---|---|---|
| 2,183,867 | 12/1939 | Johansen | 52—117 X |
| 2,634,831 | 4/1963 | Haisch | 254—139.1 X |
| 2,790,622 | 4/1957 | Priest | 52—119 X |
| 2,975,910 | 3/1961 | Conrad | 52—117 X |

HENRY C. SUTHERLAND, *Primary Examiner.*